July 9, 1946.  N. S. FOCHT  2,403,648
HYDRAULIC SHOCK ABSORBER
Filed Feb. 2, 1945  4 Sheets-Sheet 1
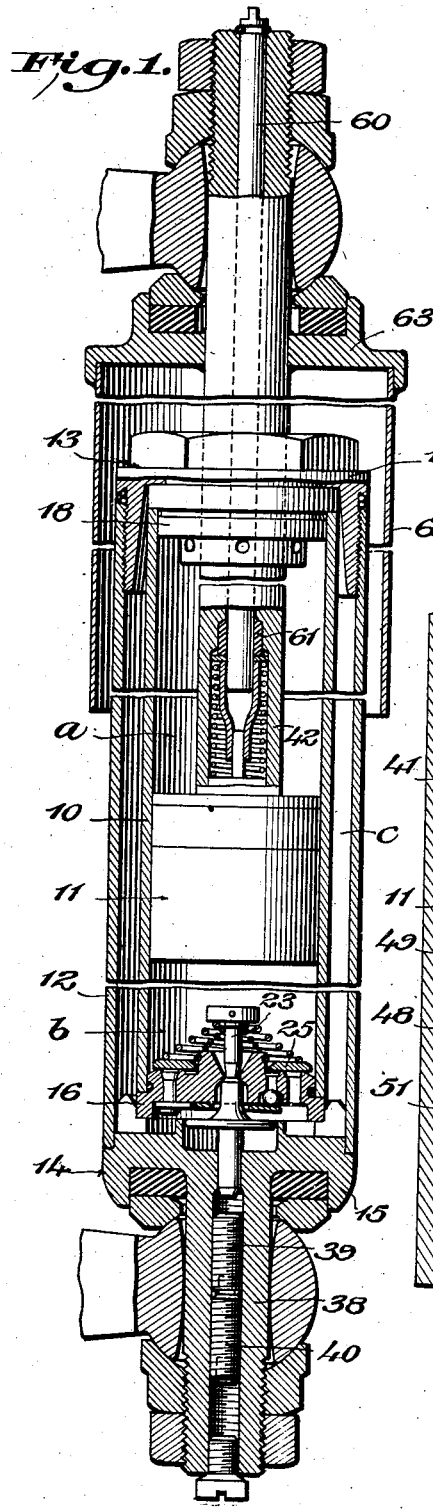
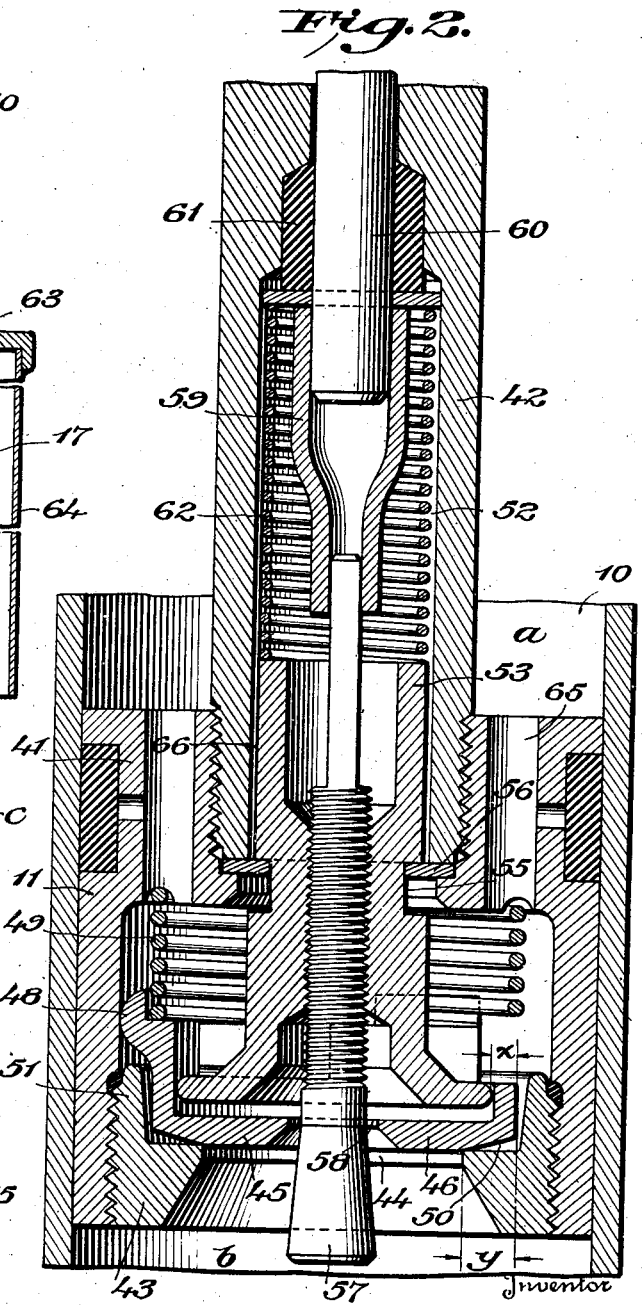
Inventor
Nevin S. Focht,
By [signature] Attorney July 9, 1946.　　　　N. S. FOCHT　　　2,403,648
HYDRAULIC SHOCK ABSORBER
Filed Feb. 2, 1945　　　4 Sheets-Sheet 2
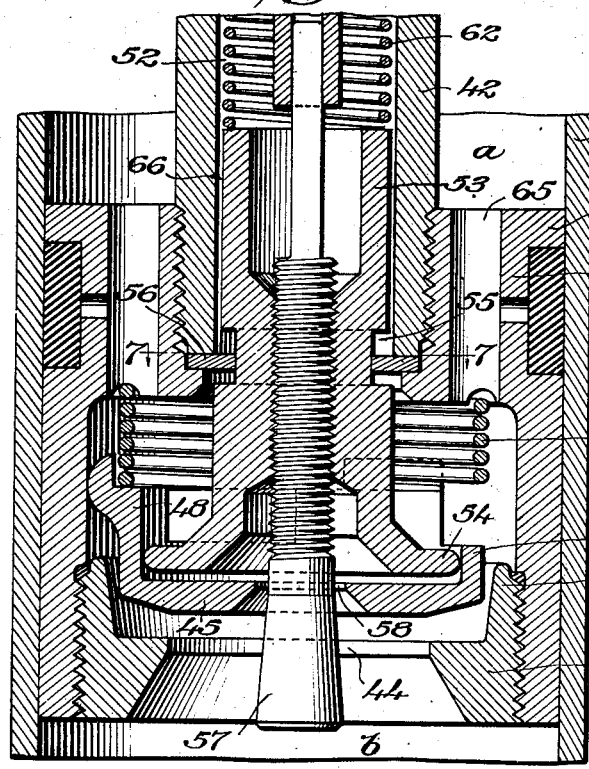
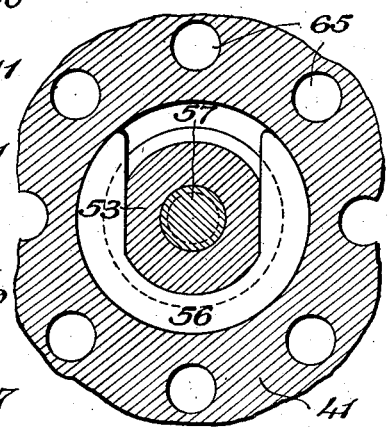
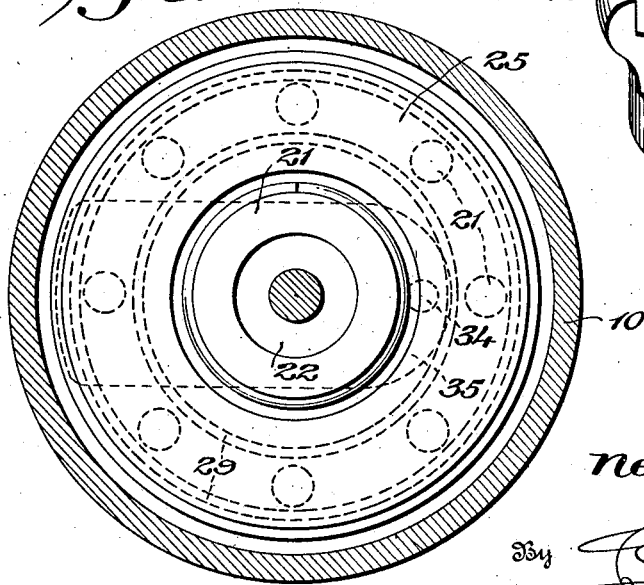
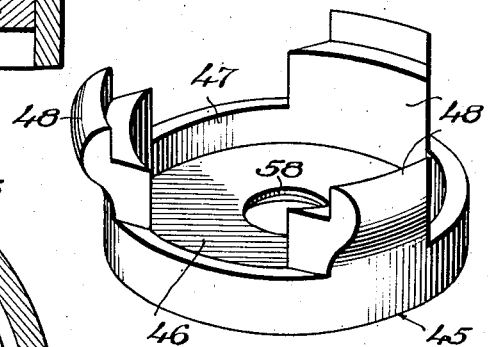
Inventor
Nevin S. Focht, July 9, 1946.  N. S. FOCHT  2,403,648
HYDRAULIC SHOCK ABSORBER
Filed Feb. 2, 1945  4 Sheets-Sheet 3

INVENTOR
Nevin S. Focht,
Emory L. Groff
Attorney

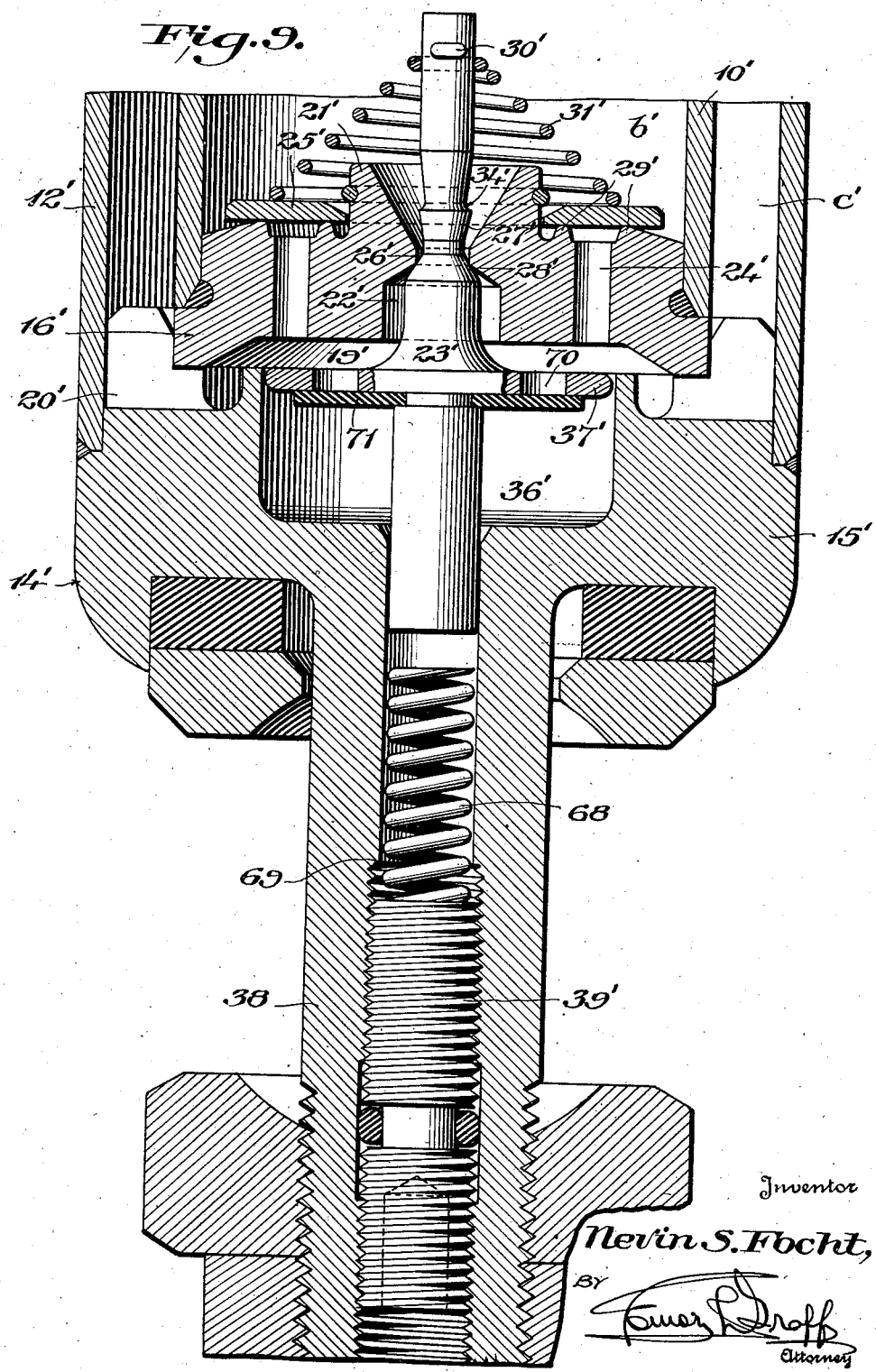

Patented July 9, 1946

2,403,648

UNITED STATES PATENT OFFICE 2,403,648

HYDRAULIC SHOCK ABSORBER

Nevin S. Focht, Syracuse, N. Y.

Application February 2, 1945, Serial No. 575,881

9 Claims. (Cl. 188—88)

This invention relates to shock absorbers, and has particular reference to improvements in hydraulic shock absorbers of the cylinder and piston, or strut type as disclosed, for example, in my prior U. S. Patent No. 2,342,729 of February 29, 1944.

Generally speaking, the object of the present invention is to provide a shock absorber which is generally similar to my said prior shock absorber, but which, as compared therewith, embodies simplified and improved valve means for controlling flow of liquid through the piston between the respective ends of the cylinder, and simplified and improved valve means for controlling flow of liquid between the cylinder and the liquid reservoir, whereby exceptionally smooth and efficient action of the shock absorber is obtained and manufacturing costs thereof are, comparatively speaking, materially reduced.

With the foregoing and other objects in view, which will become more fully apparent as the nature of the invention is better understood, the same consists in a shock absorber of the type mentioned embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 1 is a central, longitudinal section through a shock absorber embodying the features of the invention.

Figure 2 is a central, longitudinal section on an enlarged scale through the piston and the piston rod of the shock absorber showing the various positions of the valve elements thereof.

Figure 3 is a view similar to Figure 2 showing the positions assumed by the valve elements of the piston and the piston rod under the influence of compression above normal forces imposed upon the shock absorber.

Figure 6 is a section on the line 6—6 of Figure 5.

Figure 7 is a section on the line 7—7 of Figure 3,

Figure 8 is a perspective view of the piston-carried metering disk; and

Figure 9 is a view similar to Fig. 5 illustrating an alternative construction.

Figure 4:
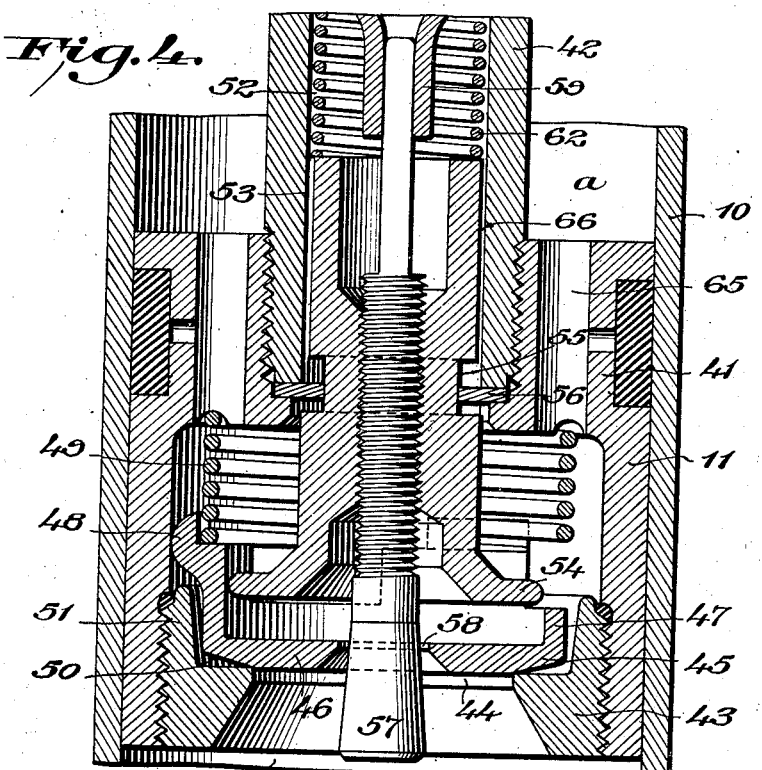
Figure 4 is a view similar to Figures 2 and 3 showing the positions assumed by the valve elements of the piston and the piston rod at the end of a compression above normal phase of operation of the shock absorber.

Referring to the drawings in detail, it will be observed that the present shock absorber is of the cylinder and piston or strut type described and claimed in my aforementioned patent and includes a cylinder 10 and a piston 11 for connection, respectively, with any desired pair of relatively movable elements such, for example, as the axle and the chassis of a motor vehicle.

While the present shock absorber may be disposed for operation either vertically or horizontally or at any desired inclination, it will be assumed, for the purpose of simplifying the present description, that it is disposed vertically.

Concentric with and surrounding the cylinder 10 in spaced relationship thereto is a tube 12, while closing the upper and the lower ends of said cylinder and tube, and holding them in their spaced apart relationship, are upper and lower heads designated generally as 13 and 14, respectively. These heads may be of any suitable construction and may be mounted in closing relationship to the ends of the cylinder 10 and the tube 12 in any suitable manner. For example, the lower head 14 may comprise a main body element 15, welded, threaded or otherwise suitably fastened to the lower end of the tube 12, and a separate valve seat element 16 superimposed upon said main body element and having the lower end of the cylinder 10 seated thereon. Likewise, the upper head 13 may comprise a main body element 17, welded, threaded or otherwise suitably fastened to the upper end of the tube 12, and a separate plug element 18 interposed between said main body element 17 and the upper end of the cylinder 10. The piston 11 divides the cylinder 10 into upper and lower pressure chambers $a$ and $b$, respectively, while the space between the cylinder 10 and the tube 12 constitutes a liquid reservoir designated as $c$.

In the bottom of the valve seat element 16 of the lower head 14 is a central recess 19, while in the top of the main body element 15 of said lower head are recesses 20 which afford communication between said central recess 19 and the reservoir $c$.

Projecting upwardly from the valve seat element 16, centrally thereof, is a boss 21, and extending through said element and said boss is a port 22 which affords communication between the recess 19 and the pressure chamber b under the control of a metering pin 23. In addition, an annular series of ports 24 in the valve seat element 16, outwardly of the boss 21, afford communication between the recess 19 and the pressure chamber b under the control of a check valve 25.

The port 22 is constricted intermediate its ends, as indicated at 26, and from its constricted portion flares upwardly and downwardly. The metering pin 23 extends through said port and has its upper end exposed within the absorber b so as to be forced downwardly by pressure of liquid in said chamber, within the effective portion of its length, said metering pin is downwardly tapered, as indicated at 27, and then is downwardly flared, as indicated at 28, its said flared portion 28 being of greater diameter than the constricted portion 26 of said port 22, and being disposed below said constricted portion, so as to seat upwardly against the downwardly flared wall deferring said port immediately below the constricted portion thereof, for the purpose of closing said port. On the other hand, the downwardly tapered portion 27 of said metering pin is of a diameter to pass through the constricted portion 26 of the port 22 and, because of its downward taper, is effective to progressively decrease the effective area of said constricted portion as said metering pin is moved downwardly to open said constricted portion for flow of liquid therethrough.

A pair of annular ribs 29 rise from the valve seat element 22, one inwardly and the other outwardly of the ports 24, and the check valve 25 is in the form of a flat ring to seat downwardly upon said ribs to close the ports 24 and to be lifted from said ribs to open said ports 24. The ring 25 surrounds the boss 21, and is guided by the same for opening and closing movements, and between said ring and an abutment 30 on the upper end portion of the metering pin 23 is interposed an expansion spiral spring 31 which tends constantly to urge said metering pin upwardly and said ring downwardly to their positions closing the port 22 and the ports 24, respectively. In addition, if found to be necessary or desirable, another spiral spring 32 may be interposed between the boss 21 and the abutment 30 to assist the spring 31 in urging the metering pin upwardly to its seated position closing the port 22.

The opening in the ring 25 is of suitably greater diameter than the boss 21 to afford a clearance space between said ring and said boss for free flow of liquid therethrough from the pressure chamber b to the space between said ring and the top of the valve seat element 21 inwardly of the inner rib 29, while extending through said valve seat element and affording communication between said last-mentioned space and the recess 19, is a port 33 with which is associated an upwardly closing, downwardly opening check valve 34, preferably in the form of a ball, which constantly is urged upwardly toward its closed position by a suitable spring 35 such, for example, as a leaf spring as shown.

In the main body element 15 of the head 14 is an open-top well 36 which is in communication at its top with the recess 19, and in this well is disposed a disk formation 37 which is of slightly lesser diameter than said well and which is carried by the metering pin 23, whereby a dash pot is afforded to cushion and retard and smooth out downward movements of said metering pin.

Depending from the main body element 15 of the head 14 is a stem 38 for use in a known manner to connect the cylinder 10 to one of the relatively movable elements, such as a vehicle axle, to be controlled by the shock absorber, and in said stem is an axial, threaded bore into which the lower end portion of the metering pin 23 extends and in which is threaded a plug 39 to serve as a stop, engageable by the lower end of said metering pin, to limit its downward movement. By adjustment of the plug 39 the limit of downward movement of the metering pin 23 may be variably predetermined to predetermine the effective area of the constricted portion 26 of the port 22 when said metering pin is at its limit of downward movement, and said plug 39 may be locked in its adjusted position by a second plug 40 threaded in the bore of said stem 38.

At the top of the piston 11 is a wall 41 having therein a central bore in which is threaded the lower end portion of a piston rod 42 which extends upwardly from said piston through the pressure chamber a and through the upper head 13 for connection in a known or any desired manner with the second of a pair of relatively movable elements, such as the chassis of a motor vehicle, to be controlled by the shock absorber.

Below the wall 41 the piston 10 is hollow, and in the lower end portion of said piston is threaded a valve seat ring 43 having therein a large, central port 44, which is controlled by a metering valve 45.

The valve 45 is contained in the hollow, lower portion of the piston 11, between the top wall 41 thereof and the valve seat ring 43, and is of cup-like form. It comprises a disk-like bottom wall 46, an open-top cylindrical portion 47 rising therefrom, and a plurality of spring perch fingers 48 rising from said cylindrical portion. Interposed between the spring perch fingers 48 and the top wall 41 of the piston 10 is an expansion helical spring 49 which tends constantly to urge said valve 45 downwardly against the valve seat ring 43 in closing relationship to the large, central port 44 in said ring. In this connection, it will be noted that said valve 45 seats against the ring 43 adjacent to the port 44 therein and that the outer portion of the under face of the disk-like bottom wall 46 of said valve is chamfered, as indicated at 50, to leave a clearance space between the same and the underlying upper face of the valve seat ring 43. It will further be noted that the valve 45 is of lesser external diameter than the surrounding cylindrical upper portion 51 of the valve seat ring 43 in which it operates, whereby a clearance space also is provided between the side of said valve and the said surrounding cylindrical upper portion 51 of said valve seat ring. In addition, it will be noted that the inner face of the portion 51 flares upwardly whereby the last-mentioned clearance space progressively increases in effective area as the valve 45 is raised or opened.

In the lower end portion of the piston rod 42 is an axial bore of relatively large diameter affording a chamber 52 which, at its bottom, is in communication with the hollow lower portion of the piston 11, and in the lower end portion of this chamber is disposed the upper end portion of a plunger 53 the lower end portion of which is provided with a disk 54 of slightly lesser diameter than the internal diameter of the open-top cylindrical portion 47 of the valve 45 within which it normally is disposed. Together, the valve 45 and the disk 54 afford a dash-pot to smooth out downward movements of the plunger 53.

The plunger 53 is longitudinally movable and is provided intermediate its ends with an external, annular recess 55 in which is disposed a U-washer 56 which is confined between the lower end of the piston rod 42 and an underlying shoulder of the piston top wall 41. This washer thus acts as a stop for cooperation with the shoulders at the ends of the annular recess 55 to limit longitudinal movements of said plunger. In this connection, the lowermost limit of movement of said plunger 53 preferably is such that its disk 54 is spaced slightly above the bottom wall 46 of the valve 45 when said valve is seated (see Fig. 2). On the other hand, the uppermost limit of movement of said plunger is such that its disk 54 is disposed above the upper edge of the cylindrical portion 47 of said valve 45 when the latter is seated (see Figure 4 which shows the plunger 53 a little below its uppermost limit of movement).

The plunger 53 is provided with an axial, threaded bore, and in this bore is threaded, for longitudinal adjustment relatives to said plunger, a metering pin 57, the lower end portion of which is of downwardly flaring form and projects beyond the lower end portion of said plunger through a central port 58 in the disk-like bottom wall 47 of the valve 45 for progressively increasing the effective area of said port responsive to downward movement of the plunger 53 and said metering pin relative to said valve 45.

The upper end portion of the metering pin 57 is of polygonal shape in cross section and has engaged thereover the polygonal lower end portion of a sleeve 59 which, at its upper end, is suitably connected to the lower end of a rod 60 for rotation by the latter. The rod 60 extends through an axial bore in the piston rod 42 to the top of said piston rod where it is exposed for engagement by any suitable implement to effect its rotation. By rotation of said rod 60, the metering pin 57 may be rotated to effect longitudinal adjustment of the same relative to the plunger 53, which latter is held against rotation by the U-washer 56.

Disposed in the upper end portion of the piston rod chamber 52 in surrounding relationship to the rod 60 is a gasket 61 of suitable resilient material, and between this gasket and the upper end of the plunger 53 is interposed an expansion, helical spring 62. Accordingly, said spring tends constantly to urge said plunger downwardly and, at the same time, exerts force constantly upwardly against the gasket 61 whereby the latter is maintained in tight sealing engagement with the rod 60 and the piston rod 42 to prevent any escape of liquid from the chamber 52 through the bore in said piston rod through which the rod 60 extends.

Suitable gasket means such, for example, as the gasket means disclosed in my prior Patent No. 2,342,729, may be provided in the upper cylinder head 13 to prevent leakage of fluid from the pressure chamber a around the piston rod 42. Moreover, the piston rod 42 may have welded or otherwise suitably fastened thereto a head 63 from which may depend over the upper portion of the shock absorber a skirt 64 to exclude foreign matter from the latter and from said piston rod.

In the top wall 41 of the piston 11 is an annular series of ports 65 which afford constant communication between the pressure chamber a and the hollow interior of said piston. In other words, the pressure chambers a and b are in communication with each other through the piston 11 under the control of the metering valve 45 and the metering pin 57.

Assuming that the piston rod 42 is connected with the chassis of a motor vehicle; that the cylinder 10 is connected to the axle of such vehicle; that the chassis is supported upon the axle through a spring which is under normal load; that the piston 11 is in a normal position approximately midway between the ends of the cylinder 10; that the metering pin 23 is in its uppermost position closing the port 22; that the valves 25, 34 and 45 are in their normally closed positions; that the plunger 53 and the metering pin 57 are in their normal downward positions; and that the shock absorber is charged with a suitable liquid, the same has four distance phases of operation; viz., (1) "compression above normal," as when an obstruction in a roadway is encountered and the vehicle spring is compressed with consequent movement of the cylinder 10 and the piston 11 relative to each other upwardly and downwardly, respectively; (2) "rebound above normal," or relative downward and upward movement of the cylinder 10 and the piston 11 from their "compression above normal" status; (3) "rebound below normal," as when a depression in a roadway is encountered and the vehicle spring is distended with consequent movement of the cylinder 10 and the piston 11 relative to each other downwardly and upwardly, respectively, from their normal relative position; and (4) "compression below normal," or relative upward and downward movement of the cylinder 10 and the piston 11 from their "rebound below normal" status.

As "compression above normal" occurs with consequent movement of the cylinder 10 and the piston 11 relative to each other upwardly and downwardly, respectively, the liquid in the chamber b is subjected to increasing pressure dependent upon the magnitude of the relative movement between the cylinder and the piston, with the result that the valve 45 is raised (see Fig. 3) and the pressure partly is relieved by flow of some of the liquid from the chamber b through the piston 11 via the ports 44 and 65 to the chamber a. Since, however, due to the presence of the piston rod 42 in the chamber a, said chamber a cannot accommodate all of the liquid which seeks to escape from the chamber b and which must escape therefrom to permit continued relative movement of the cylinder and piston upwardly and downwardly, respectively, the rising pressure of the liquid in the chamber b acts on the upper end of the metering pin 23 to force said pin downwardly.

Downward movement of the metering pin 23 results in the valve portion 28 of said pin leaving its seat and opening the port 22 for flow of liquid from the chamber b to the reservoir c via said port 22, the recess 19 and the recesses 20. The pressure in the chamber b thus is relieved. At the same time, the tapered portion 27 of the metering pin 23 is caused to coact with the constricted portion 26 of the port 22 to regulate the effective area of said constricted portion dependent upon the position assumed by said metering pin, which position is dependent in turn, on the one hand, upon the pressure generated in the chamber b and, on the other hand, upon the dash-pot action of the disk 37 operating in the well 36 and the strength of the spring 31 or the combined strengths of the springs 31 and 32, as the case may be. In this connection, road tests have shown that for low frequency compressions of the instant shock absorber, the dash-pot 36, 37 exerts little or no control on the position of the metering pin 23 and that the position of said pin is controlled primarily by the spring or springs 31, 32 to afford the correct values of shock absorber resistances to said low frequency compressions. Similarly, road tests have shown that for high-frequency compressions of the instant shock absorber, the dash-pot 36, 37 affords resistances opposing downward movement of the metering pin 23 which are proportioned to said balance high-frequency pressures generated in the chamber $b$, having positioning of said metering pin under the control of the spring or springs 31, 32 as in the case of low-frequency compressions. Thus, the instant shock absorber is substantially equally effective in resisting or absorbing all compression shocks at all vehicle speeds.

Since the space between the valve 45 and the disk portion 54 of the plunger 53 is filled with liquid under the same pressure as the liquid in the chamber $b$ acting upwardly against said valve 45, upward or opening movement of said valve 45 obviously will cause said plunger 53 to be moved upwardly therewith. In this connection, there is a clearance space 66 between the plunger 53 and the piston rod 42 for flow of liquid between the hollow portion of the piston 11 and the chamber 52 in the piston rod 42 in which the upper end portion of the plunger 53 operates, but this clearance space is small so that such flow of liquid may take place at only a relatively slow rate. The chamber 52 above the plunger 53 is, of course, filled with liquid. Therefore, the plunger 53 cannot rise rapidly, but only more or less slowly, due to the throttling of flow of liquid from the chamber 52 by the clearance space 66 as said plunger rises in said chamber 52. The clearance space 66 in any given shock absorber is definite and predetermined in relation to the vehicle spring with which the shock absorber is to be used so as effectively to control the frequency of reaction into the vehicle chassis. Moreover, the cup-like upper portion of the valve seat ring 43 is as aforesaid, of internal, upwardly flaring form, so as progressively to increase the effective area between said cup-like portion and the outside of the valve 45 for increased flow of liquid from the pressure chamber $b$ to the pressure chamber $a$ as said valve rises, and the flare of said cup-like portion is so calibrated in any of said cup-like portion is so calibrated in any given shock absorber for use with any given vehicle spring that for any given pressure generated in the chamber $b$, said valve 45 will rise or open a predetermined amount.

As relative upward and downward movement of the cylinder 10 and the piston 11 continues during a "compression above normal" phase of operation of the shock absorber, the pressure in the chamber $b$ will increase and will result in progressive downward movement of the metering pin 23 with consequent progressive decrease in the effective area of the constricted portion 26 of the port 22 and progressive throttling of flow of liquid from the pressure chamber $b$ to the reservoir $c$. Thus, by the combined actions of the metering pin 23 and the valve 45, flow of liquid from the chamber $b$ to the chamber $a$ and the reservoir $c$ will be regulated to cause the shock absorber properly to resist or buff the "compression above normal" forces to which it is subjected. In this connection, the resistance to relative high frequency inward movement of the cylinder 10 and the piston 11 obviously will progressively increase until the metering pin 23, by downward movement thereof, acts to close or substantially to close, the constricted portion 26 of the port 22, which will occur only during the final portion of relative movement between the cylinder 10 and the piston 11 or, in other words, only during the final portion of compression of the vehicle spring. Accordingly, so-called "bottoming" at the end of the vehicle spring compression is effectively avoided.

Should the pressure in the chamber $b$ tend to rise above the maximum pressure which the shock absorber is designed to withstand, the valve 34 will open and permit liquid in said chamber $b$ to flow into the reservoir $c$, thus relieving the chamber $b$ of pressure and safeguarding the shock absorber against damage. In this connection it will be understood, of course, that for a vehicle body and chassis of given weight and a vehicle spring of a given strength and amplitude of movement, a shock absorber of the present type intended for use in conjunction therewith will be designed to offer an effective resistance to compression of the vehicle spring and will cease to do so only under a load equal to or greater than would produce so-called "bottoming" of the vehicle spring. Thus, the spring 35 will be of a strength to maintain the valve 34 closed under all normal loads to which the shock absorber may be subjected and to permit said valve to open only under abnormal loads imposed upon the shock absorber.

As the "rebound above normal" phase of operation occurs following the just described "compression above normal" phase of operation, the cylinder 10 and the piston 11 move relatively apart or downwardly and upwardly, respectively, and thereby subject the liquid in the chamber $a$ to pressure. Upon initiation of this phase of operation, the valve 45, which was raised during the "compression above normal" phase of operation and which carried the plunger 53 and the metering pin 57 up with it, immediately is returned to its seat by the spring 49. The plunger 55, however, is not immediately returned to its lowermost position by the spring 62, but only is gradually returned toward such position by said spring, due to the clearance space 66 throttling flow of liquid into the chamber 52 above said piston. In this connection, dependent upon the severity of the force which resulted in the "compression above normal" phase of operation of the shock absorber, the plunger 53 may have been raised a greater or lesser amount such that its disk portion 54 may be disposed above or below the top of the side wall 47 of the valve 45 when said valve closes at the beginning of the "rebound above normal" phase of operation of the shock absorber. In the former case, upon initiation of the "rebound above normal" phase of operation the valve 45 will remain closed and liquid will flow from the pressure chamber $a$ through the ports 65, between the disk portion 54 of the plunger 53 and the upper edge of the side wall 47 of said valve 45 into said valve, and from the latter through the central port 58, therein into the pressure chamber $b$ under the control of the metering pin 57, the lower, downwardly flaring portion of which will act, as said metering pin moves slowly downwardly with the plunger 53, to progressively increase the effective area of said port 58 to permit increased flow of the liquid as the pressure increases. This will afford the desired control of relative outward movement of the cylinder 10 and the piston 11 and of the rebound energy during the high frequency initial part of the "rebound above normal" phase of operation of the shock absorber and will continue until the disk portion 54 enters the cup-like portion of the valve 45, it being understood, of course, that proper adjustment of the metering pin 57 to afford the desired control will have been made. Conditions then will be the same as if the "compression above normal" phase of operation of the shock absorber had not lifted the plunger 53 so far as to cause its disk portion 54 to be disposed above the upper edge of the side wall 47 of the valve 45 when the latter is closed. In short, either at the beginning of the "rebound above normal" phase of operation of the shock absorber or at the time during such phase of operation when the frequency of the pitch to be controlled is low, which usually is during the latter part of said phase of operation, the disk portion 54 of the plunger 53 will be disposed in the cup-like top portion of the valve 45.

When the foregoing condition exists, liquid will not be free to flow into the valve 45 and through the port 58 therein. Therefore, control of "rebound above normal" of flow of the liquid and consequent control of relative outward movement of the cylinder 10 and the piston 11, will be shifted from the port 58 and the metering pin 57 to the clearance space between the periphery of the disk portion 54 of the plunger 53 and the inner face of the side wall 47 of the valve 45, which clearance space is relatively narrow and of such predetermined area as to regulate flow of the liquid to afford the desired low frequency pitch control.

Upon occurrence of the "rebound below normal" phase of operation of the shock absorber, should the pressure of the liquid in the chamber *a* rise to a value such that its proper flow is not permitted by the clearance space between the periphery of the disk 54 and the wall 47, then the liquid in said chamber *a* will exert its pressure downwardly upon the valve 45 from the periphery of the disk 54 to the outside of the side wall of said valve, as indicated at *x* in Figure 2, and upwardly upon said valve from its periphery to its line of seating against the valve seat ring 43, as indicated at *y* in Figure 2, by virtue of the space afforded beneath said valve by the chamfering of the outer, under face thereof. The area *y* is greater than the area *x*. The pressure acting upwardly upon the valve 45 therefore will predominate with the result that said valve will be lifted from its seat. Liquid then may dump directly from the chamber *a* into the chamber *b* through the port 44, thus permitting the vehicle wheel to drop into a rut or the like without pulling the chassis down. As the pressure in the chamber *a* diminishes, the valve 45 will move toward its seat and throttle flow of the liquid until control of the flow is returned to the clearance space between the disk 54 and the wall 47 of said valve 45 and the port 57 controlled by the metering pin 57.

During the upward unloading movement of the valve 45, the liquid in the space between said valve and the disk 54 will be forced through the port 58 around the metering pin 57, which will afford a dash-pot action smoothing out this unloading operation. And since this dash-pot action will be governed by the effective area of the orifice 58, it will be proportional to the rebound energy to be controlled, because of proper adjustment of the metering pin 57 to control this energy on the "rebound above normal" phase of operation of the shock absorber.

The "compression below normal" phase of operation of the shock absorber occurs immediately following the "rebound below normal" phase of operation thereof and is caused by the vehicle wheels rising out of a depression or hole in a roadway and the resulting effort toward reestablishment of a condition of equilibrium between the energy of the vehicle chassis exerted downwardly against the force of the vehicle spring exerted upwardly. The loss of vehicle spring energy during this phase of operation is below that needed to maintain equilibrium while the vehicle wheel is riding out of the depression or hole in the roadway and is compensated for by the resistance to compression of the shock absorber offered by the valve 23.

Pitching or low-frequency compression and rebound of the vehicle spring usually is such as to require the transfer of only a minor amount of liquid between the chambers *a* and *b*. Accordingly, the clearance space between the disk 54 and the wall 47 of the valve 45 provides for this transfer of liquid to control pitching or low frequency compression and rebound of the vehicle spring while the valve 45 remains closed.

Figure 5:
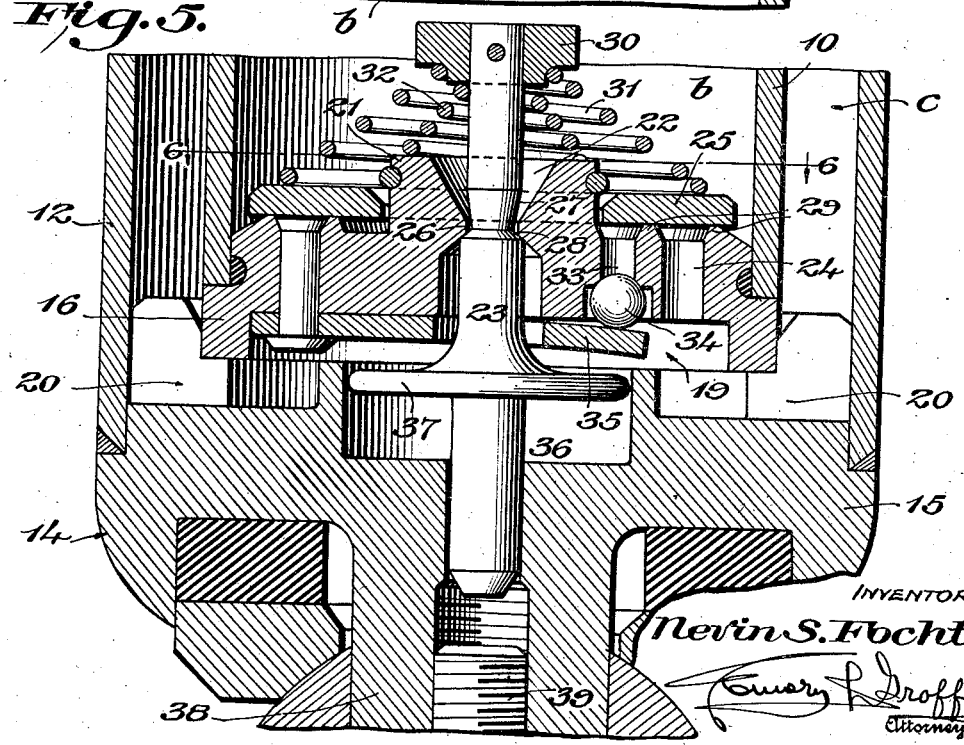
Figure 5 is a central, longitudinal section on an enlarged scale through the valve means for controlling flow of liquid from the cylinder to the reservoir of the shock absorber when the latter is subjected to compression forces.

Referring to Fig. 9 of the drawings, it will be observed that the construction illustrated therein is generally the same as the construction illustrated in Fig. 5. Accordingly, the same reference characters, primed, are employed to designate in Fig. 9 parts which correspond to parts shown in Fig. 5. It will further be observed that the Fig. 9 construction amounts, in effect, to advantageously eliminating the blow-off valve 34 of the Fig. 5 construction and advantageously combining said valve with the metering pin 23 of said Fig. 5 construction. In other words, according to the Fig. 9 construction, the metering pin, designated as 23', directly above its tapered portion 27', is sharply reduced in cross sectional area, as indicated at 34', so that, following a sufficient amount of downward movement of said pin to bring the top of its tapered portion 27' into the constricted portion 26' of the port 22', a slight additional amount of downward movement thereof will result in its reduced portion 34' being brought into said constricted portion 26' with the consequence of permitting free flow or dumping of liquid from the chamber *b'* into the reservoir *c'*. Thus, the reduced portion 34' performs the same purpose as the blow-off valve 34 of the Fig. 5 construction. Moreover, by forming the metering pin 23' so that it serves also as a blow-off valve, the construction is much simplified as compared with the Fig. 5 construction and, most importantly, blow-off can occur only in definite phase or relationship to functioning of the metering portion 27' of said metering pin, which is of decided advantage over the Fig. 5 construction due to the difficulties in obtaining proper strength of the spring 35 to cause blow-off to occur at the proper time in relation to functioning of the metering portion 27' of the metering pin 23'.

In the bore of the stem 38', and seated at its lower end upon a plug 39' adjustably threaded in said bore, is a helical spring 68 the upper end of which may normally be engaged with the lower end of the metering pin 23' or spaced therebelow to be engaged by the same as said metering pin moves downwardly. In any event, by adjusting the plug 39' the resistance offered by said spring 68 to downward movement of the metering pin 23' may be varied to predetermine the blow-off pressure generated in the chamber *b*. Thus, according to the Fig. 9 construction, the shock absorber may readily be adjusted to adapt it for most efficient operation in association with any particular spring suspension with which it may be used, and in that connection the Fig. 9 construction is of further decided advantage over the Fig. 5 construction which lacks any provision for adjustment of the spring 35 to vary the blow-off pressure. In order to prevent the plug 39' from being adjusted so far upwardly as to cause the spring 68 to prevent the metering pin 23' from moving downwardly to its blow-off position, the stem 38 preferably is provided with a shoulder 69 or equivalent stop means to limit upward adjustment of said plug 39'.

According to the Fig. 9 construction, the metering pin disk or dash-pot plunger 37' is provided with ports 70 and with a suitable cooperating check-valve 71 in the form of a flexible disk, as shown, or of other suitable form, to prevent liquid from flowing from the dash-pot well 36' upwardly through said ports 70 during downward movement of the metering pin 23', and to permit free flow of liquid through said ports into said well during upward movements of said metering pin. Thus, quick return of the metering pin 23' to a proper operating position is assured whenever a reduction of the pressure in the chamber b permits said metering pin to rise, which insures effective operation of the shock absorber in absorbing a rapid succession of shocks such as may be produced by the vehicle upon which the shock absorber is used passing over a succession of "bumps." Obviously, the disk or dash-pot plunger 37 of the Fig. 5 construction may be provided with ports and a cooperating check valve as in the case of the disk or plunger 37' of the Fig. 9 construction.

The valve seat element 16' of the Fig. 9 construction is, of course, devoid of any port such as the port 33 of the Fig. 5 construction so that all flow of liquid from the chamber b to the reservoir c necessarily is through the port 22' under the control of the combined metering pin and blow-off valve.

Except for the described differences in construction and mode of operation over the Fig. 5 construction, the Fig. 9 construction is, to all intents and purposes, substantially the same, both in construction and mode of operation, as the Fig. 5 construction.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a hydraulic shock absorber, a cylinder, a piston reciprocable therein, a liquid reservoir, a head closing the lower end of said cylinder, said head having therein a port providing communication between the lower end of said cylinder and said reservoir, a metering pin upwardly movable to close said port and having a downwardly tapered portion for downward movement into said port to progressively decrease the effective area of said port, the top of said metering pin being exposed within the lower end of said cylinder for subjection to liquid pressure to urge said pin downwardly, yieldable means tending constantly to urge said pin upwardly to close said port, and a dash pot controlling downward movement of said metering pin.

2. In a hydraulic shock absorber, a cylinder, a piston reciprocable therein, a liquid reservoir, a head closing the lower end of said cylinder, said head having therein a port providing communication between the lower end of said cylinder and said reservoir, a metering pin upwardly movable to close said port and having a downwardly tapered portion for downward movement into said port to progressively decrease the effective area of said port, the top of said metering pin being exposed within the lower end of said cylinder for subjection to liquid pressure to urge said pin downwardly, yieldable means tending constantly to urge said pin upwardly to close said port, a disk carried by said metering pin, and a well in which said disk operates and from which it has clearance to afford a dash-pot to control downward movement of said metering pin.

3. In a hydraulic shock absorber, a cylinder, a piston reciprocable therein, upper and lower heads closing the ends of said cylinder, a piston rod extending upwardly from said piston through the upper head, said piston being hollow and including a port for flow of liquid therethrough between the cylinder spaces above and below the same, an upwardly opening downwardly closing cup-like valve cooperating with said port to control flow of liquid through said piston, spring means tending constantly to close said valve, said valve having a port therein, a downwardly flared metering pin in said port, a plunger carrying said metering pin, means whereby said plunger and said metering pin are lifted with said valve when the latter is opened, and are constrained to move gradually downwardly following closing of said valve, and a disk on said metering pin to enter said valve and control flow of liquid through the latter during the final portion of downward movement of said plunger and said metering pin.

4. In a hydraulic shock absorber, a cylinder, a piston reciprocable therein, upper and lower heads closing the ends of said cylinder, a piston rod extending upwardly from said piston through the upper head, said piston being hollow and including a port for flow of liquid therethrough between the cylinder spaces above and below the same, an upwardly opening downwardly closing valve for cooperation with said port to control flow of liquid through said piston, yieldable means tending constantly to urge said valve downwardly toward its closed position, said valve having a port therein, and a metering pin for controlling flow of liquid through the port in said valve, said valve having a lesser top than bottom area thereof exposed to the pressure of the liquid in the space above said piston whereby it is lifted and opened when the pressure of the liquid in the cylinder space above said piston rises to a value such that its differential lifting action on said valve exceeds the force of said yieldable means tending to close the same.

5. In a hydraulic shock absorber, a cylinder, a piston reciprocable therein, upper and lower heads closing the ends of said cylinder, a piston rod extending upwardly from said piston through said upper head, said piston having a port for flow of liquid therethrough between the cylinder spaces above and below the same, an upwardly opening downwardly closing cup-like valve for cooperation with said port to control flow of liquid through said piston, yieldable means tending constantly to urge said valve downwardly toward its closed position, said valve being exposed at its bottom to the pressure of the liquid in the cylinder space below said piston so as to be lifted by the pressure of the liquid in said space when the pressure rises to a predetermined value, said valve having a port therein, a metering pin disposed in said port, said metering pin having a disk portion normally disposed in said valve whereby it is lifted by said valve when the latter is lifted, said yieldable means being effective to quickly move said valve downwardly to its closed position when the pressure of the liquid in the cylinder space below said piston falls below said predetermined value, and means constraining said metering pin to move slowly downwardly following closing of said valve, thereby to meter flow of liquid through the port in said valve from the cylinder space above to the cylinder space below said piston until said disk enters said valve should it be disposed above the latter, said disk when disposed in said valve having slight clearance therefrom to regulate flow of the liquid through the same.

6. In a hydraulic shock absorber, a cylinder, a piston reciprocable therein, upper and lower heads closing the ends of said cylinder, a piston rod extending upwardly from said piston through said upper head, said piston having a port for flow of liquid therethrough between the cylinder spaces above and below the same, an upwardly opening downwardly closing cup-like valve for cooperation with said port to control flow of liquid through said piston, yieldable means tending constantly to urge said valve downwardly toward its closed position, said valve being exposed at its bottom to the pressure of the liquid in the cylinder space below said piston so as to be lifted by the pressure of the liquid in said space when the pressure rises to a predetermined value, said valve having a port therein, said piston rod having in its lower end portion a chamber communicating at its bottom with the cylinder space above said piston, a plunger vertically movable in said chamber, spring means urging said plunger downwardly, said plunger having slight clearance from the wall surrounding said chamber whereby it is constrained to move slowly downwardly when it is raised, a metering pin carried by said plunger and disposed in the port in said valve for regulating flow of liquid therethrough, a disk on said metering pin normally disposed in said valve whereby it and said plunger are raised when said valve is lifted and opened, said disk having slight clearance from said valve when it is disposed therein, said yieldable means being effective to move said valve quickly downwardly to its closed position when the pressure of the liquid in the cylinder space below said piston falls below said predetermined value, whereby flow of liquid from the cylinder space above to the cylinder space below said piston is through the port in said valve under the control of said metering pin if said disk is disposed above said valve and is under the control of the clearance space between said disk and said valve when said disk enters or is disposed in said valve.

7. In a hydraulic shock absorber, a cylinder, a piston reciprocable therein, a liquid reservoir, a head closing the lower end of said cylinder, said head having therein a port affording communication between the lower end of said cylinder and said reservoir, a metering pin extending through said port and having a downwardly tapered portion for downward movement into said port to progressively decrease the effective cross sectional area thereof, the top of said metering pin being exposed within the lower end portion of said cylinder for subjection to liquid pressure to urge said pin downwardly, and yieldable means tending constantly to urge said metering pin upwardly, said metering pin directly above its downwardly tapered portion being of sharply and materially reduced cross sectional area to quickly and materially increase the effective cross sectional area of said port responsive to a predetermined amount of downward movement of said metering pin.

8. In a hydraulic shock absorber, a cylinder, a piston reciprocable therein, a liquid reservoir, a head closing the lower end of said cylinder, said head having therein a port affording communication between the lower end of said cylinder and said reservoir, a metering pin extending through said port and having a downwardly tapered portion for downward movement into said port to progressively decrease the effective cross sectional area thereof, the top of said metering pin being exposed within the lower end portion of said cylinder for subjection to liquid pressure to urge said pin downwardly, yieldable means tending constantly to urge said pin upwardly, a disk carried by said metering pin, a well in which said disk operates and with which it cooperates to afford a dash pot to control downward movement of said metering pin, said disk having a port therein, and a check valve cooperating with said port to prevent liquid from flowing therethrough from said well during downward movement of said metering pin and to permit liquid to flow freely therethrough into said well during upward movement of said metering pin.

9. In a hydraulic shock absorber, a cylinder, a piston reciprocable therein, a liquid reservoir, a head closing the lower end of said cylinder, said head having therein a port affording communication between the lower end of said cylinder and said reservoir, a metering pin extending through said port and having a downwardly tapered portion for downward movement into said port to progressively decrease the effective cross sectional area thereof, the top of said metering pin being exposed within the lower end portion of said cylinder for subjection to liquid pressure to urge said pin downwardly, yieldable means tending constantly to urge said pin upwardly, a disk carried by said metering pin, a well in which said disk operates and with which it cooperates to afford a dash pot to control downward movement of said metering pin, said disk having a port therein, a check valve cooperating with said port to prevent liquid from flowing therethrough from said well during downward movement of said metering pin and to permit liquid to flow freely therethrough into said well during upward movement of said metering pin, and means for adjusting said yieldable means to vary the resistance offered by the same to downward movement of said metering pin in any given position of downward movement of said pin.

NEVIN S. FOCHT.